US008127103B2

(12) United States Patent
Kano et al.

(10) Patent No.: US 8,127,103 B2
(45) Date of Patent: Feb. 28, 2012

(54) STORAGE APPARATUS, MEMORY AREA MANAGING METHOD THEREOF, AND FLASH MEMORY PACKAGE

(75) Inventors: Yoshiki Kano, Yokohama (JP);
Sadahiro Sugimoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 689 days.

(21) Appl. No.: 12/248,124

(22) Filed: Oct. 9, 2008

(65) Prior Publication Data

US 2010/0030946 A1    Feb. 4, 2010

(30) Foreign Application Priority Data

Jul. 30, 2008   (JP) .................................. 2008-195654

(51) Int. Cl.
*G06F 12/12* (2006.01)
(52) U.S. Cl. .................. 711/173; 711/103; 711/E12.009
(58) Field of Classification Search .................. 711/103, 711/173, E12.009
See application file for complete search history.

(56) References Cited

U.S. PATENT DOCUMENTS

| 6,529,416 | B2 | 3/2003 | Bruce et al. | |
| 7,039,788 | B1 | 5/2006 | Chang et al. | |
| 7,596,643 | B2 * | 9/2009 | Merry et al. | 710/56 |
| 2003/0014595 | A1 * | 1/2003 | Doteguchi et al. | 711/130 |
| 2005/0050111 | A1 * | 3/2005 | Sensnovis | 707/203 |
| 2006/0168369 | A1 | 7/2006 | Ohno et al. | |
| 2008/0104309 | A1 * | 5/2008 | Cheon et al. | 711/103 |
| 2008/0141055 | A1 * | 6/2008 | Danilak | 713/340 |
| 2008/0172519 | A1 * | 7/2008 | Shmulevich et al. | 711/103 |

FOREIGN PATENT DOCUMENTS

JP   2004-005370   1/2004

* cited by examiner

*Primary Examiner* — Pierre-Michel Bataille
*Assistant Examiner* — Hal Schnee
(74) *Attorney, Agent, or Firm* — Antonelli, Terry, Stout & Kraus, LLP.

(57) ABSTRACT

A storage device is provided, which allows a write area associated with a data area of interest to be allocated according to write performance of a host computer. The storage apparatus includes one or more flash memory packages having a plurality of flash memories and stores data transmitted from one or more host computers. A storage area provided by the one or more flash memory packages includes a first area that is an area for storing actual data formed by one or more logical devices and a second area that is an area for storing a write instruction from the host computer to the logical device. The first and second areas are provided in each of the one or more flash memory packages. The apparatus further includes a monitoring section monitoring the frequency of write instructions from the host computer and a changing section for changing the size of the second area according to the frequency of write instructions.

19 Claims, 21 Drawing Sheets

FIG. 3

| FM-PK# | START ADDRESS POSITION | END ADDRESS POSITION | BLOCK SIZE | PAGE SIZE |
|---|---|---|---|---|
| 1 | 0x000⋯00000 | 0x0004⋯0000 | 256KB | 2KB |
| 2 | 0x000⋯00000 | 0x0008⋯0000 | 256KB | 2KB |
| 3 | 0x000⋯00000 | 0x0012⋯0000 | 256KB | 2KB |
| ⋯ | ⋯ | ⋯ | ⋯ | ⋯ |

FIG. 4

| RG# | FM-PK | RAID CONFIGURATION |
|---|---|---|
| 1 | FM-PK #1 | RAID5(3D+1P) |
| | FM-PK #2 | |
| | FM-PK #3 | |
| | FM-PK #4 | |
| 2 | FM-PK #5, FM-PK #9 | RAID5(3D+1P) |
| | FM-PK #6, FM-PK #10 | |
| | FM-PK #7, FM-PK #11 | |
| | FM-PK #8, FM-PK #12 | |
| ... | ... | ... |

| FM-PK# | USER AREA START POSITION TO END POSITION | WRITE AREA START POSITION TO END POSITION | SUBSTITUTION AREA START POSITION TO END POSIITON |
|---|---|---|---|
| | 501 / 502 | 503 | 504 |
| 1 | 0x00 ...... 0000 ~ 0x00 ...... 9999 | 0x0002 ...... 0000 ~ 0x0002 ...... 9999 | 0x0003 ...... 0000 ~ 0x0004 ...... 000 |
| 2 | 0x00 ...... 0000 ~ 0x00 ...... 9999 | 0x0002 ...... 0000 ~ 0x0002 ...... 9999 | 0x0003 ...... 0000 ~ 0x0004 ...... 000 |
| 3 | 0x00 ...... 0000 ~ 0x00 ...... 9999 | 0x0002 ...... 0000 ~ 0x0002 ...... 9999 | 0x0003 ...... 0000 ~ 0x0004 ...... 000 |
| ... | ... | ... | ... |
| 9 | — | 0x0002 ...... 0000 ~ 0x0002 ...... 9999 | 0x0003 ...... 0000 ~ 0x0004 ...... 000 |
| 10 | — | 0x0002 ...... 0000 ~ 0x0002 ...... 9999 | 0x0003 ...... 0000 ~ 0x0004 ...... 000 |
| 11 | — | 0x0002 ...... 0000 ~ 0x0002 ...... 9999 | 0x0003 ...... 0000 ~ 0x0004 ...... 000 |
| 12 | — | 0x0002 ...... 0000 ~ 0x0002 ...... 9999 | 0x0003 ...... 0000 ~ 0x0004 ...... 000 |
| ... | ... | ... | ... |

| LDEV# | RG# | START ADDRESS | CAPACITY | WRITE PERFORMANCE (iops) |
|---|---|---|---|---|
| 1 | 1 | 0x00···00 | 32GB | 12131 |
| 2 | 1 | 0x01···00 | 16GB | 10 |
| 3 | 1 | 0x02···00 | 2GB | 3232 |
| ... | ... | ... | ... | ... |
| 10 | 2 | 0x02···00 | 100GB | 2312 |
| 11 | 2 | 0x04···00 | 20GB | 0 |
|  |  |  |  |  |

| LDEV# | RG# | START ADDRESS | ALLOCATED PAGE COUNT | USED PAGE COUNT | RECLAMATION FREQUENCY (NUMBER OF TIMES/DAY) |
|---|---|---|---|---|---|
| 1 | 1 | 0x0002··· ···1000 | XXXXXX | xxxxxx | P |
| 2 | 1 | 0x0002··· ···2000 | ZZZZZZ | zzzzzz | Q |
| 3 | 1 | 0x0002··· ···3000 | YYYYYY | yyyyyy | R |
| ··· | ··· | ··· | ··· | ··· | ··· |
| 10 | 2 | 0x0011··· ···1000 | ··· | ··· | ··· |
| 11 | 2 | 0x0012··· ···1000 | ··· | ··· | ··· |
| ··· | ··· | ··· | ··· | ··· | ··· |

| WWN | PORT# | LUN | LDEV# |
|---|---|---|---|
| 50060E80C93BC394 | 1 | 1 | 1 |
| 50060E80C93BC394 | 1 | 2 | 2 |
| 50060E80C93BC394 | 1 | 3 | 3 |
| ... | ... | ... | ... |
| 50060E80C93BC395 | 2 | 1 | 10 |
| 50060E80C93BC395 | 2 | 2 | 11 |
| ... | ... | ... | ... |

WRITE AREA MANAGEMENT

| RG# | ALLOCATION | | | | NUMBER OF RECLAMA-TIONS (NUMNER OF TIMES/DAY) | RECLAMATION PERCENTAGE % | AP SETTING PERCENTAGES (LOWER LIMIT/UPPER LIMIT) | ALERT |
|---|---|---|---|---|---|---|---|---|
| | LDEV # | PERCENTAGE % | RECOMMENDED PERCENTAGE % | ALERT | | | | |
| 1 | 1 | 20 △▽ | 30 | !! | P | 82 | 10/80 | FLASH MEMORY PACKAGES MUST BE INCREASED |
| | 2 | 4 △▽ | 10 | | Q | 10 | — | FLASH MEMORY PACKAGES MUST BE REDUCED |
| | 5 | 5 | 5 | | R | 40 | — | |
| | ... | ... | ... | ... | ... | ... | ... | ... |
| ... | ... | ... | ... | ... | ... | ... | ... | ... |

RECLAMATION THRESHOLD (UPPER LIMIT): 80 %

RECLAMATION THRESHOLD (LOWER LIMIT): 20 %

Cancel   Apply   OK

FIG. 19
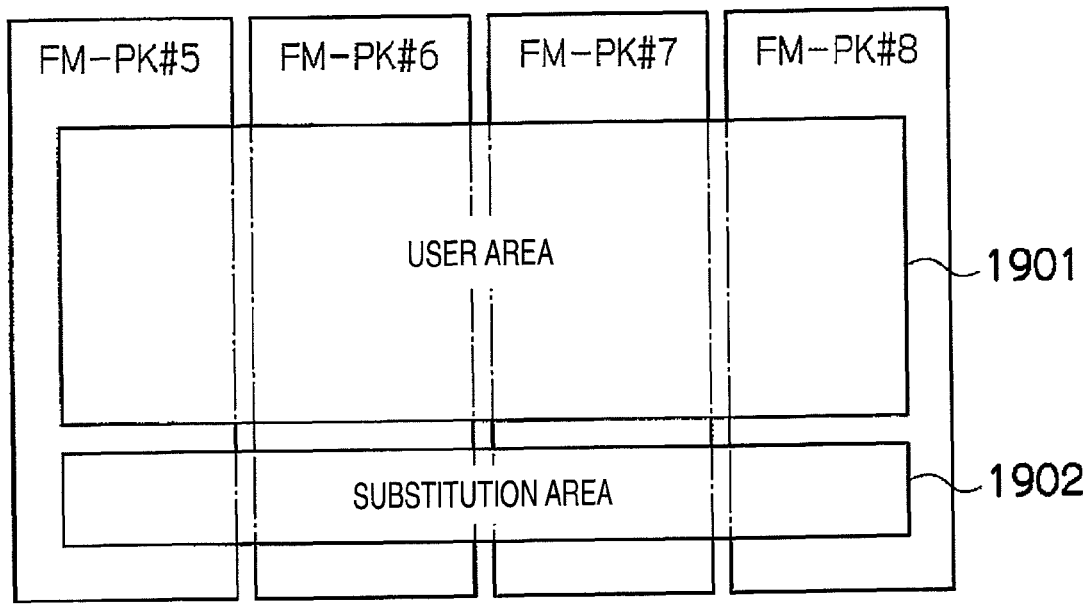
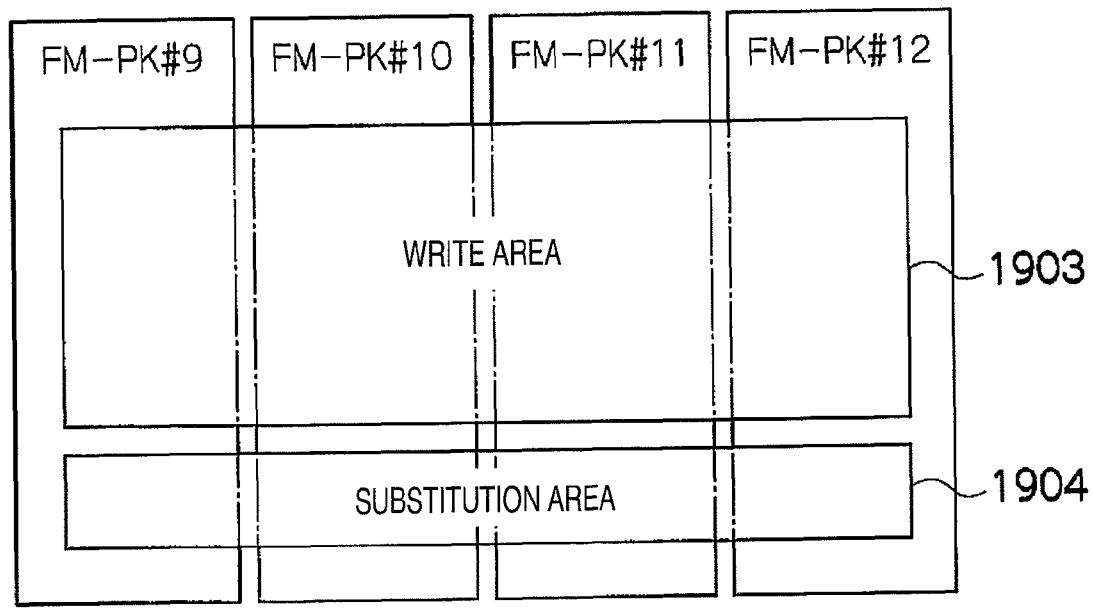

STORAGE APPARATUS, MEMORY AREA MANAGING METHOD THEREOF, AND FLASH MEMORY PACKAGE

CROSS REFERENCES TO RELATED APPLICATIONS

This application relates to and claims priority from Japanese Patent Application No. 2008-195654, field on Jul. 30, 2008, the entire disclosure of which is incorporated herein by reference.

BACKGROUND OF THE INVENTION

1. Field of the Invention

The present invention relates to a storage apparatus used in a computer system and, more particularly, to a storage apparatus using non-volatile semiconductor memories such as flash memories as memory media thereof, a memory area managing method of the apparatus, and a flash memory package.

2. Description of the Related Art

In general, a storage apparatus includes random-accessible non-volatile memory media. For example, the random-accessible non-volatile memory media may be magnetic disks (hereinafter referred to as hard disks) or optical disks, and a configuration including a multiplicity of hard disks is employed as described in Patent Document 1 (listed ahead).

Recently, more attention is paid to storage apparatus employing non-volatile semiconductor memories such as flash memories as memory media, to replace hard disks used in the related art. A flash memory is more advantageous than a hard disk in that it can operate at a higher speed with less power consumption. Patent Document 2 (listed ahead) discloses a technique used in a storage apparatus to allow a hard disk used in the storage apparatus to be replaced with a flash memory disk which includes a plurality of flash memories and which can be accessed using a hard disk accessing device according to the related art such as an SCSI (Small Computer System Interface).

Patent Document 3 (listed ahead) discloses a method of allowing a flash memory to be efficiently written. According to the method, a block in a flash memory is divided into a write area and a data area, and write data is additionally written in the form of logs in the write area. When a certain amount of data is accumulated in the write area, the data in the block is read into a memory to overwrite the memory with the data in the write area. Thereafter, the data is written in the data area. Such a writing method is called a reclamation method.

Patent Document 1: JP-A-2004-5370
Patent Document 2: U.S. Pat. No. 6,529,416
Patent Document 3: U.S. Pat. No. 7,039,788

When it is attempted to improve write performance by dividing a region of a flash memory into a data area and a write area as described above, substantially no reclamation of the write area occurs in some occasions where there is a small number of write instructions (a.k.a write or write command), depending on the application executed by the host computer of the memory. A problem then arises in that the write area thus allocated will not be efficiently used.

In order to solve the above-described problem, it is desirable to provide a storage apparatus which allows a write area associated with a data area of interest to be allocated in accordance with the write performance of its host computer. When the write area is reduced in accordance with write performance, the number of the relevant flash memory packages must be also reduced in accordance with the write performance.

SUMMARY OF THE INVENTION

The invention was made taking the above-described points into consideration, and there is proposed a storage apparatus which allows a write area to be efficiently allocated according to write instructions from host computers. A storage area managing method and a flash memory package to be used with such an apparatus are also proposed.

According to the invention, there is provided a storage apparatus which includes one or more flash memory packages having a plurality of flash memories and which stores data transmitted from one or more host computers. A storage area provided by the one or more flash memory packages includes a first area that is an area for storing actual data formed by one or more logical devices, and a second area that is an area for storing a write instruction from the host computer. The first and second areas are provided in each of the one or more flash memory packages. The storage apparatus monitors the frequency of write instructions from the host computer and changes the size of the second area according to the frequency of the write instructions.

In such a configuration, a write area can be efficiently allocated according to the write instructions from the host computer. The unit of storage area may be set depending on each application or each host computer. Then, the size of the second area can be changed using a unit of size which depends on each application or each host computer.

When it is attempted to reduce the second area by deleting an entire flash memory package from the storage area, the position of the deleted flash memory package may be displayed in deleting the unnecessary flash memory package.

BRIEF DESCRIPTION OF THE DRAWINGS

FIG. 3 shows an example of a flash memory address table in the first example embodiment of the invention;

FIG. 4 shows an example of a table of RAID configurations utilizing flash memory packages in the first example embodiment of the invention;

FIG. 5 shows an example of a user area/write area/substitution block area table used for area management of flash memory packages in the first example embodiment of the invention;

FIG. 7 shows an example of a table showing information on configurations and performance of logical devices in the first example embodiment of the invention;

FIG. 8 shows an example of a table showing numbers of pages of write areas allocated to the logical devices, numbers of pages which have been used, and reclamation frequency, in the first example embodiment of the invention;

FIG. 9 shows an example of a table showing mapping between logical unit ports, logical units, and logical devices in the first example embodiment of the invention;

FIG. 15 is an illustration showing an example of a GUI for managing write areas associated with logical devices in the first example embodiment of the invention;

FIG. 19 is an illustration showing an image of each area formed in a RAID configuration using flash memory packages in the second example embodiment of the invention;

DETAILED DESCRIPTION

Example embodiments of the invention will now be described with reference to the drawings. It should be noted that the invention is not limited to the following example embodiments.

First Example Embodiment

A first example embodiment of the invention will now be described. According to the first embodiment, a storage apparatus having flash memory packages carrying flash memory chips thereon allocates required write areas in association with user areas (also called data areas) for storing actual data based on write input/output instructions from a host.

In the present embodiment, a user area as a first area and a write area as a second area, are provided in each of the flash memory packages. The provision of the two types of areas is advantageous in that the number of the user areas can be increased when an additional flash memory package is provided.

Figure 1:
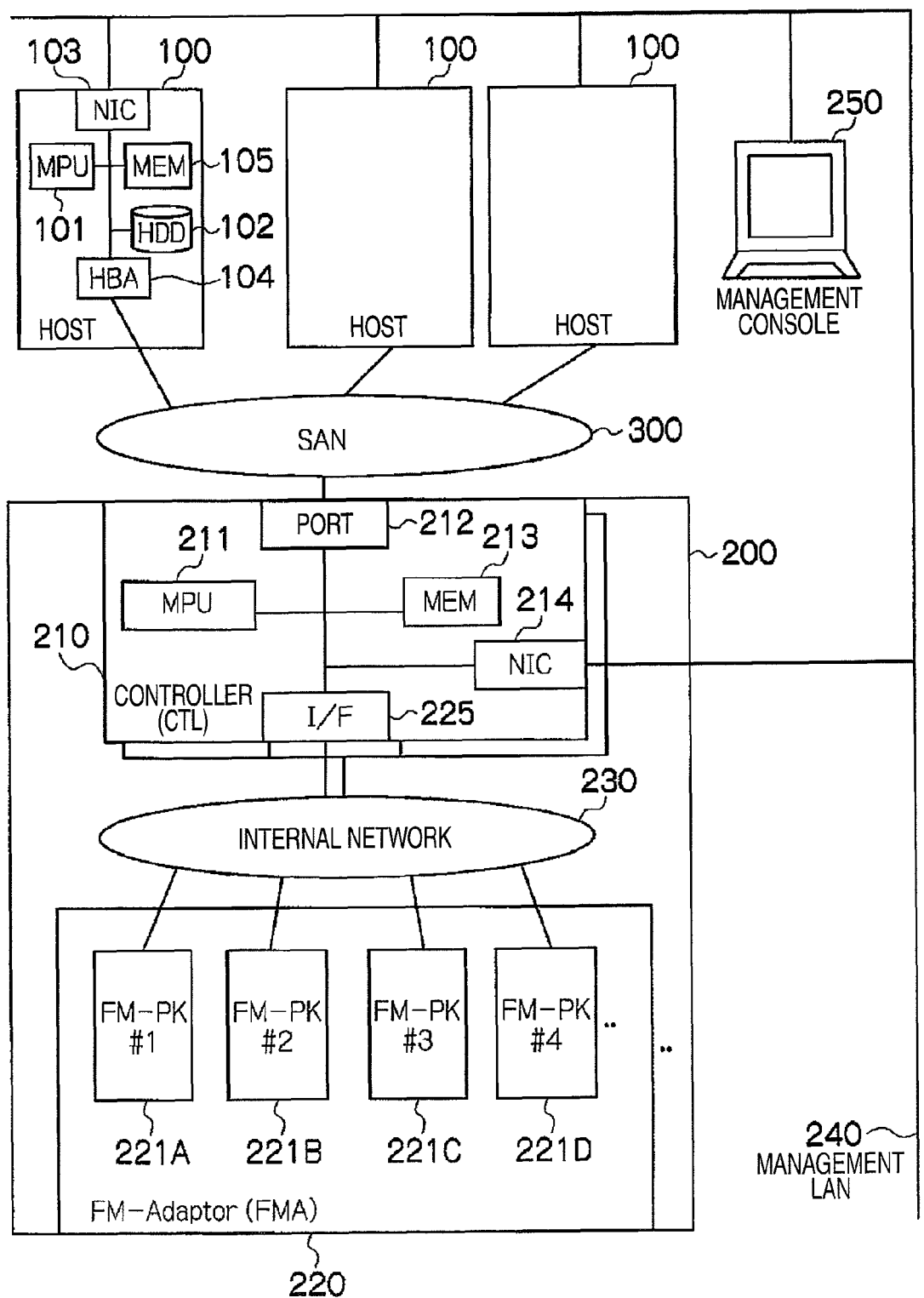
FIG. 1 is an illustration showing an example of a configuration of a computer system in a first example embodiment of the invention.
Figure 2:
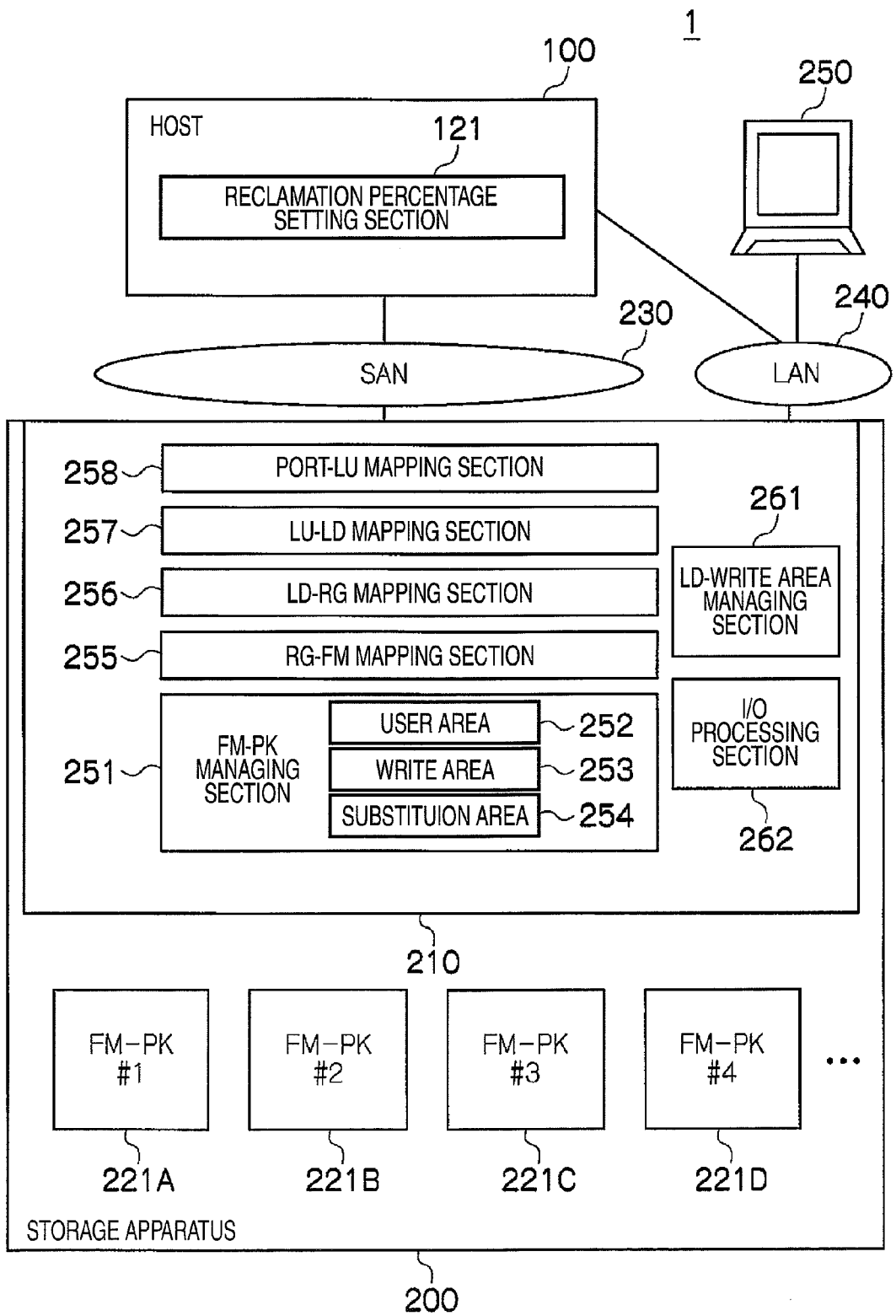
FIG. 2 is an illustration showing an example of a logical configuration of the computer system in the first example embodiment of the invention.

First, configurations of a computer system 1 involved in the first embodiment will be described. FIGS. 1 and 2 are illustrations showing example configurations of the computer system 1. FIGS. 3 to 9 are tables showing example management information used by the computer system 1.

FIG. 1 is an illustration showing an example of a configuration of the computer system 1. The computer system 1 includes a plurality of host computers (hereinafter also referred to as "hosts") 100, a storage apparatus 200, and a management console 250.

The hosts 100 and the storage apparatus 200 are connected through an SAN (Storage Area Network) 300 which is an input/output network over which data to be stored in the storage apparatus 200 can be transmitted.

The SAN 300 may be a switch in general which allows communication according to the SCSI (Small Computer System Interface) protocol. For example, in the case of the Fiber Channel protocol, a Fiber Channel switch is used. In the case of the iSCSI (Internet Small Computer System Interface) protocol, an Ethernet switch allowing an iSCSI to operate is used. In the case of the Fiber Channel over Ethernet protocol, an Ethernet switch is used. Differing ones of the hosts 100 and the storage apparatus 200 may be connected through any of such switches. For the convenience of description, the present example embodiment of the invention is described on an assumption that a Fiber Channel switch utilizing the Fiber Channel protocol is used.

It is assumed here that the hosts 100 are common servers including an MPU (Micro Processing Unit) 101, a memory 105, a hard disk 102, a network interface circuit (NIC) 103, and a host bus adaptor (HBA) 104.

The NIC 103 uses a communication control method which allows communication according to TCP/IP (Transmission Control Protocol/Internet Protocol) such as Ethernet (a registered trademark of Xerox Corporation, U.S.A.), a wireless LAN (Local Area Network) according to IEEE 802.11a, b, g, j, n or the like, or an FDDI (Fiber-Distributed Data Interface). For the convenience of description, the present example embodiment is described on an assumption that the Ethernet communication control method is used.

The host bus adaptor 104 includes an input/output interface in compliance with the protocol of the SAN 300, in order to be connected to the SAN 300 as described above. In the present embodiment, the adaptor includes a Fiber Channel input/output interface.

The storage apparatus 200 includes a plurality of controllers 210 and a plurality of flash memory adaptors (FMA) 220 (which will be detailed later). The controllers 210 and the flash adaptors 220 are connected to each other by an internal network 230.

A network allowing access to a flash memory chip in a flash memory package such as PCI-X or PCI express may be used as the internal network 230. Regarding an interface, an interface may be operated on the internal network 230 such that access takes place on a block-by block basis for additional writing of data on a page-by-page basis. The present example embodiment is based on an assumption that flash memories are directly accessed. However, the invention is not limited to a network as described above, and it may be preferable that additional writing is performed on a page-by-page basis and access is allowed on a block-by-block basis by using an SSD (Solid-State drive) carrying flash memories and is capable of processing SCSI commands. A network using the SCSI protocol such as a Fiber Channel interface or Ethernet may be employed.

The controllers 210 process SCSI commands from the hosts 100. The controllers include an MPU 211, a port 212, a cache memory 213, an NIC 214, and an interface 225 which can be connected to the internal network 230.

The flash memory adaptors (abbreviated to read "FMA" in the drawings) 220 may be slots for accommodating a plurality of flash memory packages (abbreviated to read "FM-PK" in the drawings) 221A, 221B, 221C, 221D, and so on (collectively called 221 ahead).

The flash memory packages 221A and so on are connected through the internal network 230 described above. A plurality of flash memory packages may be provided as described above, each package can be identified by a natural number following "#" in the present example embodiment, the numbering starting with 1.

Flash memory chips (not shown) are mounted on the flash memory packages 221 to store data from the hosts 100. A portion of block of areas of a flash memory chip can be read out, for example, in 512-byte units, and the block can be written, for example, in pages on an additional-write basis after data in the block is erased. The present example embodiment is based on an assumption that blocks and pages are expressed in units of 256 KB and 2 KB, respectively, for example. Although the present embodiment has been described on an assumption that data is read out in 512-byte units, an alternative mode of implementation is possible. One example is an arrangement in which eight bytes of data as a security code associated with 512 bytes of data, is stored in a separate block for the purpose of management.

The management console 250 may be connected to the storage apparatus 200 and to each host 100, through a management LAN (Local Area Network) 240. The management console 250 is provided for making settings in the storage apparatus 200 and for monitoring the apparatus.

FIG. 2 is an illustration showing an example of a logical configuration of the computer system 1. The hosts 100 include a reclamation percentage setting section 121 which may be provided for each application. The reclamation percentage setting section 121 provides the storage apparatus 200 with a range (an upper limit and a lower limit) for the frequency of reclamation per day. Those values may be provided by an application vendor as default values in a program of a program package. Alternatively, those values may be set by a manager using a file or a management interface such as a GUI (Graphic User Interface), and recommended values may be advised by the application using an information transmission section via the SAN 230 or the LAN 240.

Frequency information indicating the frequency of reclamation (the range of frequency (upper and lower limits)) may be transmitted via the SAN 230 or the LAN 240. When the information is transmitted via the SAN 230, for example, the range (upper and lower limits) of frequency of reclamation per day may be set in a RAID manager which exercises storage control via a SAN provided, for example, by Hitachi Corporation, the range being in the form of a rate specified in the range of 0 to 100%. The RAID manager may set a command device in the storage apparatus 200, and communication between a host 100 and the storage apparatus 200 is enabled by performing read and write processes in a particular area of the command device. When the information is transmitted via the LAN 240, connection is established via TCP/IP, and communication between a host 100 and the storage apparatus 200 is made through the NIC 214 of the storage apparatus 200.

The storage apparatus 200 receives an SCSI command transmitted from a host 100, and accesses (reads or writes) a flash memory chip on a flash memory package. Major operations are performed by an I/O processing section 262 of a controller 210. The I/P processing section 262 operates in conjunction with a port-LU (Logical Unit) mapping section 258, an LU-LDEV (Logical Device) mapping section 257, an LDEV (Logical Device)-RG (RAID group) mapping section 256, an RG-FM (Flash Memory) mapping section 255, and a flash memory package managing section 251.

The port-LU (Logical Unit) mapping section 258 holds an LU list associated with SCSI read and write commands from the host 100 for input and output to and from logical unit ports, the LU list allowing the I/O processing section to select an adequate logical unit specified by an SCSI command. The LU-LDEV mapping section 257 allows the I/O processing section to manage the logical device (to be detailed later) associated with the logical unit selected by the port-LU mapping section. The LDEV-RG mapping section 256 stores and processes mapping relationships between flash memory packages having a RAID (Redundant Array of Inexpensive (or Independent) Disks) configuration associated with the logical devices and user areas. The RG-FM mapping section 255 stores and processes mapping relationships between the RAID configuration and the flash memory packages.

The flash memory package managing section 251 may include a user area 252 for storing user data, a write area 253 for temporarily storing write data, and a substitution area 254 for managing a defective block on a flash memory chip.

The size of the write area 253 varies in each of logical devices belonging to the same RAID group depending on changes in the write performance of a host 100 or a percentage specified by the reclamation percentage setting section 121 described above.

An LD-write area managing section 261 manages the size of the write area based on the write performance of each logical device or a value specified by the reclamation percentage setting section 121.

Details of each example management table will now be described. FIG. 3 shows an example of a flash memory address table 300. The flash memory address table 300 has a flash memory package number field 301, a start address position field 302, an end address position field 303, a block (BLK) size field 304, and a page size field 305.

Flash memory package numbers are stored in the flash memory package number field 301. The position of the start address of a storage area formed by a plurality of flash memory chips associated with each flash memory package number specified in the flash memory package number field 301 is stored in the start address position field 302. The position of the end address of the same storage area is stored in the end address position field 303. The sizes of blocks of flash memory chips are stored in the block size field 304. Page sizes are stored in the page size field 305. This example shows that the controller accesses flash memory based on start and end address toward several flash memory chips logically. This logical access method may be used to establish a converter using the flash memory chip controller to bridge address space between logical address space and several physical flash chips. This embodiment doesn't show further details because this is not core invention.

In the present embodiment, start address positions and end address positions may be defined in a 64-bit hexadecimal address space. For example, the flash memory chips used in the present embodiment may be MLCs (Multi-Level Cells). When data is written in a block, the block is accessed in one direction from a start address position to an end address position, to write the data in 2-KB units on a page-by-page basis. Data is read in 512-KB units, for example.

FIG. 4 shows an example of a table 400 of RAID configurations utilizing flash memory packages, the table being used by the RG-FM mapping section 255. The RAID configuration table 400 has a RAID group number field 401, a flash memory package field 402, and a RAID configuration field RAID group numbers are stored in the RAID group number field

401. Numbers representing a plurality of flash memory packages forming each RAID group are stored in the flash memory package field 402. RAID configurations of RAID groups are stored in the RAID configuration field 403.

For example, a RAID group 1 is formed by flash memory packages #1 to #4 and protected using a distributed parity of RAID level 5. The distributed parity may be generated based on the unit of the cache memory 213 managed by the storage apparatus 200 or a value such as a flash memory chip block size. In the present embodiment, a flash memory chip block size is used. Referring to the management of flash memory packages, a plurality of flash memory packages may be concatenated, and a RAID configuration may be formed between the concatenated flash memory packages. In a RAID group 2 which is shown as an example of such a configuration, a flash memory package #5 and a flash memory package #9 are concatenated. Similarly, flash memory packages #6, #7, and #8 are concatenated with flash memory packages #10, #11, and #12, respectively, to form a RAID 5 configuration (3 data plus 1 parity).

FIG. 5 shows an example of a user area/write area/substitution block area table 500 used for area management of flash memory packages carried out by the flash memory package managing section 251. The user area/write area/substitution block area table 500 has a flash memory package number field 501, a user area field 502, a write area field 503, and a substitution area field 504.

Flash memory package numbers are stored in the flash memory number field 501. The addresses of starting positions and end position of user areas to be used as storage areas for users are stored in the user area field 502. Addresses from starting positions up to end positions of write areas in which data is temporarily written and recorded on a page-by-page basis are stored in the write area field 503. Addresses from starting positions up to end positions of substitution areas to be substituted for defective blocks of the user areas or write areas are stored in the substitution area field 504.

In the present embodiment, the user areas, the write areas, and the substitution areas of a flash memory package are managed, for example, as 64-bit hexadecimal address spaces. Actual data access is made by specifying a block of flash memory chips, and data is read, for example, in 512-byte units and written in 2K-byte units.

When flash memory packages are employed to improve the performance of writing of flash memory chips as described later, the packages may include write areas only. In this case, since no user area is provided, a symbol "-" is used to indicate that no user area is set as shown in the column for user areas of a flash memory package #9 by way of example.

Figure 6A:
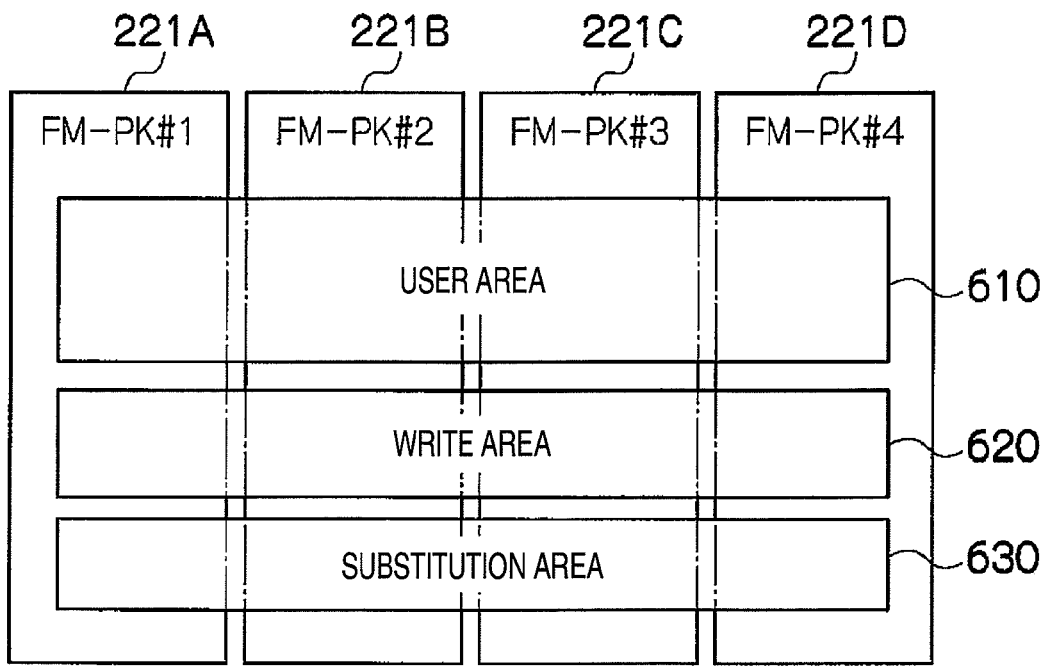
FIG. 6A is an illustration showing an image of areas formed in a RAID configuration using flash memory packages in the first example embodiment of the invention.

FIG. 6A is an illustration showing an image of areas of a group of flash memory packages managed by the flash memory package managing section 251. The configuration of the RAID group #1 in FIG. 5 is shown by way of example.

The flash memory package managing section 251 protects data in the RAID group #1 using a RAID 5 (3 data plus 1 parity) configuration formed by the flash memory packages #1, #2, #3, and #4 and forms one storage space. After creating one RAID storage space, the flash memory package managing section 251 forms a user area 610, a write area 620, and a substitution area 630 in the space.

Figure 6B:
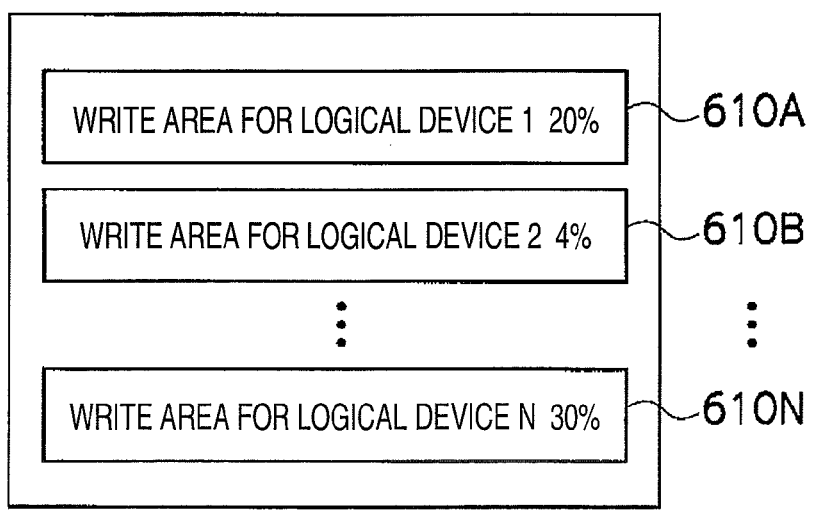
FIG. 6B is an illustration showing an example of a write area allocated to each logical device in the first example embodiment of the invention.

Thereafter, the user area 610 is divided by the LD-RG mapping section 256 into storage areas for individual logical devices. Write areas are allocated for the logical devices thus created. The allocation of write areas is carried out by the LD-write area managing section 261 to allocate write areas for individual logical devices, e.g., a write area 610A for a logical device 1, a write area 610B for a logical device 2, and a write area 610N for a logical device N, as shown in FIG. 6B. Details of the allocating operation will be described later.

FIG. 7 shows an example of a table 700 used by the LD-RG mapping section 256, the table showing information on configurations and performance of logical devices. The table 700 has a logical device number field 701, a RAID group number field 702, a start address field 703, a capacity field 704, and a write performance field 705.

Numbers staring with 0 assigned to logical devices are stored in the logical device number field 701. Numbers assigned to RAID groups are stored in the RAID group number field 702. Start addresses of storage spaces are stored in the start address field 703. Capacities of the storage spaces are stored in the capacity field 704. Write performance (inputs/outputs per second) expressed in the form of numbers of writes per second is stored in the write performance field 705.

The LD-RG mapping section 256 specifies logical devices using logical device numbers starting with 0, and storage spaces of the logical devices are formed based on RAID group numbers and start addresses and logical device capacities associated therewith. The start addresses, for example, coincide with the address spaces of the RAID groups, and the start addresses come, for example, at intervals which are expressed in blocks. Similarly, capacity increases are expressed in blocks. The I/O processing section 262 monitors the write performance of each logical device and stores a value indicating the same in the write performance field 705.

FIG. 8 shows an example of a table 800 used by the LD-write area managing section 261, the table showing numbers of pages of write areas allocated to the logical devices and numbers of pages which have been used. The table 800 has a logical device number field 801, a RAID group number field 802, a start address field 803, an allocated page count field 804, a used page count field 805, and a reclamation frequency field 806.

The logical device numbers are stored in the logical device number field 801. The RAID group numbers are stored in the RAID group number field 802. Start addresses of the logical devices are stored in the start address field 803. Counts of pages allocated to the logical devices are stored in the allocated page count field 804. Counts of pages which have been used among the allocated pages are stored in the used page count field 805. Frequencies of reclamation such as the numbers of times reclamation carried out per day as shown in FIG. 8 are stored in the reclamation frequency field 806.

The LD-write area managing section 261 forms a write area associated with a logical device number using, for example, a start address and an allocated page count. The LD-write area managing section 261 also manages an allocated write area. Specifically, the section monitors the count of used pages of the area and the number of times reclamation carried out per day and stores the results in the used page count field 805 and the reclamation frequency field 806, respectively. In the present example embodiment, an end address of the write area calculated from the start address and an allocated page count calculated from the page unit may be used in the table. Alternatively, an end address calculated by a user may be stored in the table 800. Referring to an initial value for allocation of a write area, when a logical device is added, since there is no write I/O, a predetermined percentage of the capacity of the logical device, e.g., 10% of the capacity of the logical device may be allocated as a write area.

FIG. 9 shows an example of a mapping table 900 used by the port-LU mapping section 258 and the LU-LD mapping section 257, the table showing mapping between logical unit ports, logical units, and logical devices. The mapping table 900 has a WWN field 901, a port number field 902, a logical unit number field 903, and a logical device number field 904.

World Wide Names held by the storage apparatus 200 are stored in the WWN field 901. Port numbers are stored in the port number field 902. Logical unit numbers (LUNs) are stored in the logical unit number field 903. Logical device numbers are stored in the logical device number field 904.

In the port-LU mapping table 900, the World Wide Names and the port numbers are associated with each other before the storage apparatus 200 is shipped. The manager creates a logical unit associated with a specified port and allocates a logical unit number in the port-LU mapping section 258 and allocates a logical device number in the LU-LD mapping section 257 via the management console 250.

Figure 10:
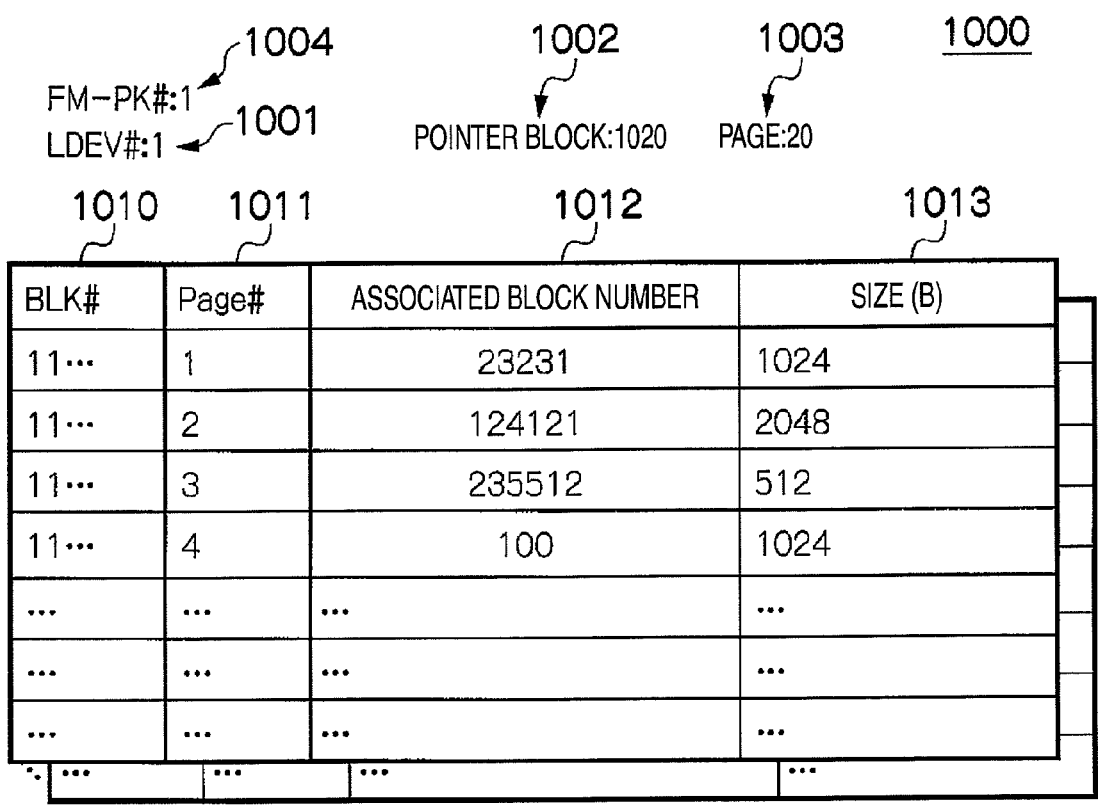
FIG. 10 shows an example of a table for managing write areas associated with logical devices in the first example embodiment of the invention.

FIG. 10 shows an example of a table 1000 used by the LD-write area managing section 261, the table showing locations where write data on a write area is to be saved. The table 1000 has a block number field 1010, a page number field 1011, an associated block number field 1012, and a size field 1013.

Block numbers are stored in the block number field 1010. Page numbers are stored in the page number field 1011. Block numbers associated with the block numbers in the field 1010 are stored in the associated block number field 1012. The sizes of stored data are stored in the size (byte) field 1013.

In the table 1000, management information of each flash memory package specified by a flash memory package number 1004 is held, and a destination of page write for each logical device is stored.

When a write I/O is received from a host 100, the I/O processing section 262 writes data in an area indicated by two numbers, i.e., a pointer block number (pointer BLK) 1002 and a pointer page number (Page) 1003 indicating the next area to be written among storage areas having the logical device number 1001 in the flash memory package to be written. The section 262 saves the block number (BLK #) 1010, the page number (Page #) 1011, the associated flash memory block (BLK #) in the user area, and the size 1013 of the stored data in the table 1000. The pointer page number "Page" is a number increasing in page-units.

The above description has outlined a configuration of the computer system 1 of the first embodiment and management information used by the computer system 1.

Operations of the computer system 1 will now be described. Specifically, the description will address allocation of various areas carried out after flash memory packages are introduced, and operations associated with a write access from a host 100 to an allocated area. The description will also address managing operations required at such an access.

Figure 11:
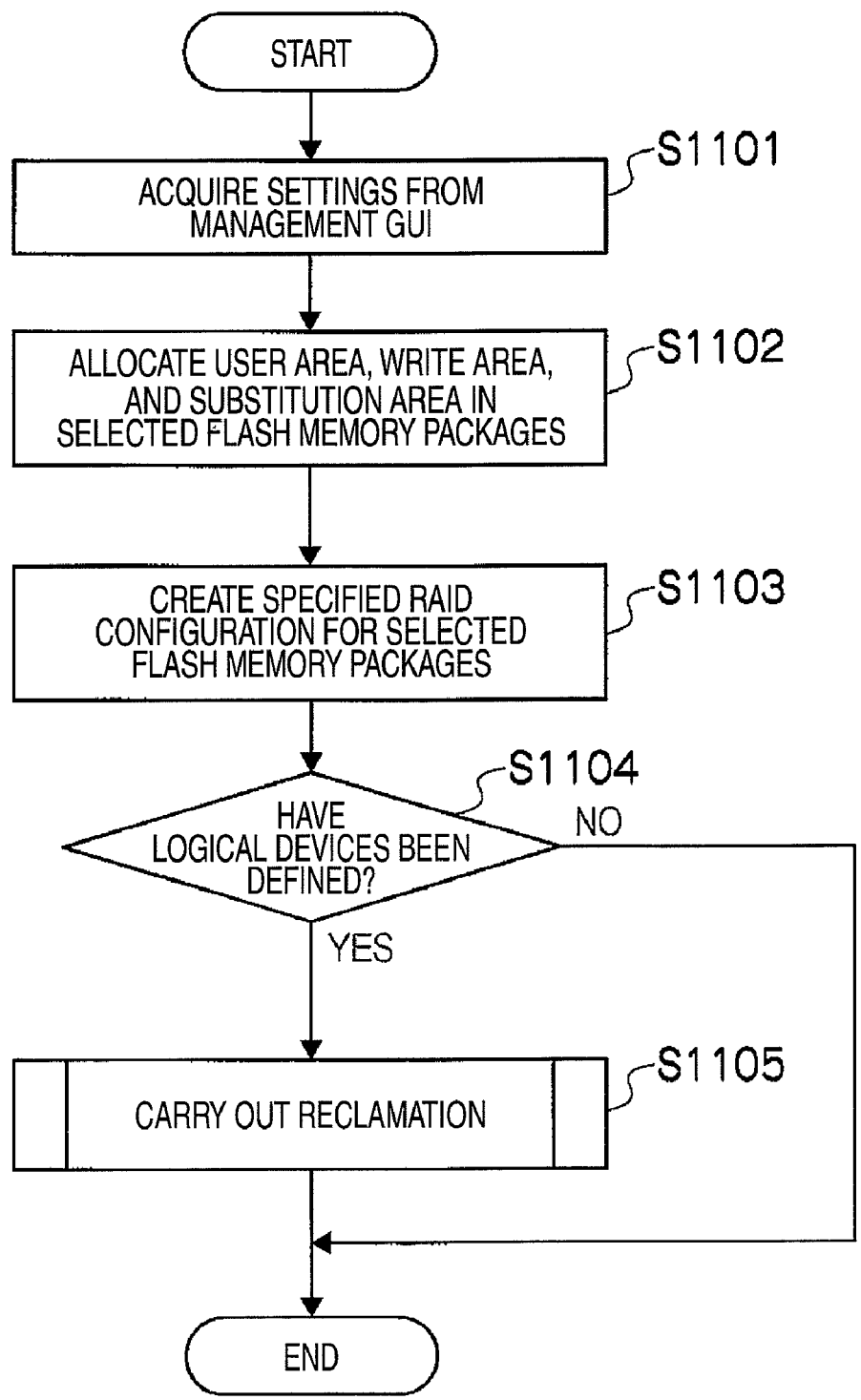
FIG. 11 is an example flow chart showing operations taken to allocate a RAID configuration and various areas to flash memory packages in the first example embodiment of the invention.

FIG. 11 is an example flow chart showing operations taken by the controller 210 when allocating a RAID configuration and various areas to flash memory packages. The operations will be described below.

After flash memory packages are added to the storage apparatus 200, the manager uses a management GUI shown in FIG. 17 to be described later on the management console 250 to select a RAID type 1710 and percentages 1730 of various areas (a user area 1733, a write area 1734, and a substitution area 1735). Required flash memory packages 1720 are selected, and an "add" button 1753 is depressed to add RAID groups to the area managing section. At operation S1101, the controller 210 acquires settings made by the manager.

At operation S1102, the controller 210 partitions the added flash memory packages according to the percentages of various areas. Specifically, the packages are divided based on percentages specified for the user areas, the write areas, and the substitution areas where the percentages total at 100% at end positions determined from the addresses of end positions of the flash memory packages. When the flash memory packages have different end positions, a common end position may be set for the flash memory packages with reference to the smallest storage area among the flash memory packages. In this case, unused areas will remain, and such areas may be used as the substitution areas. Referring again to the partitioning step, when partitioning is carried out, end positions are determined such that block sizes defined by flash chip memories and shown in the block size field 304 are accommodated in the areas specified by percentages. A write area 503 which follows a user area field 502 starts at the start address of the block of a flash memory chip that is in the 0-th place counted from the area having the percentage specified for a user area. Specifically, when the end position of the user area calculated from the percentage has an overlap of 124 KB with the block size (256 KB) of the flash memory chip, the write area starts at the start address of the block having the overlap. A substitution area 1735 is disposed relative to a write area 1734 in the same way. The disposition is merely an example, and unused areas may be intentionally provided to clearly partition areas including areas for management information.

At operation S1103, the controller 210 creates specified RAID configurations for selected flash memory packages. Specifically, RAID group numbers, flash memory package numbers, and RAID configurations are stored in the RAID group field 401, the flash memory package number field 402, and the RAID configuration field 403 of the Table 400, respectively, as shown in FIG. 4. After such a setting is made, the storage apparatus 200 operates according to the specified RAID configurations.

At operation S1104, the controller 210 refers to the LD-RG mapping table 700 described above using FIG. 7 to check whether logical devices have been generated in areas associated with the RAID group numbers thus created. When the logical devices have been generated (S1104: YES), the process proceeds to operation S1105. When the logical devices have not been generated (S1104: NO), the process is terminated.

At operation S1105, the controller 210 performs a reclamation process. Details of the reclamation process will be described later. The area allocation process is thus terminated.

Figure 12:
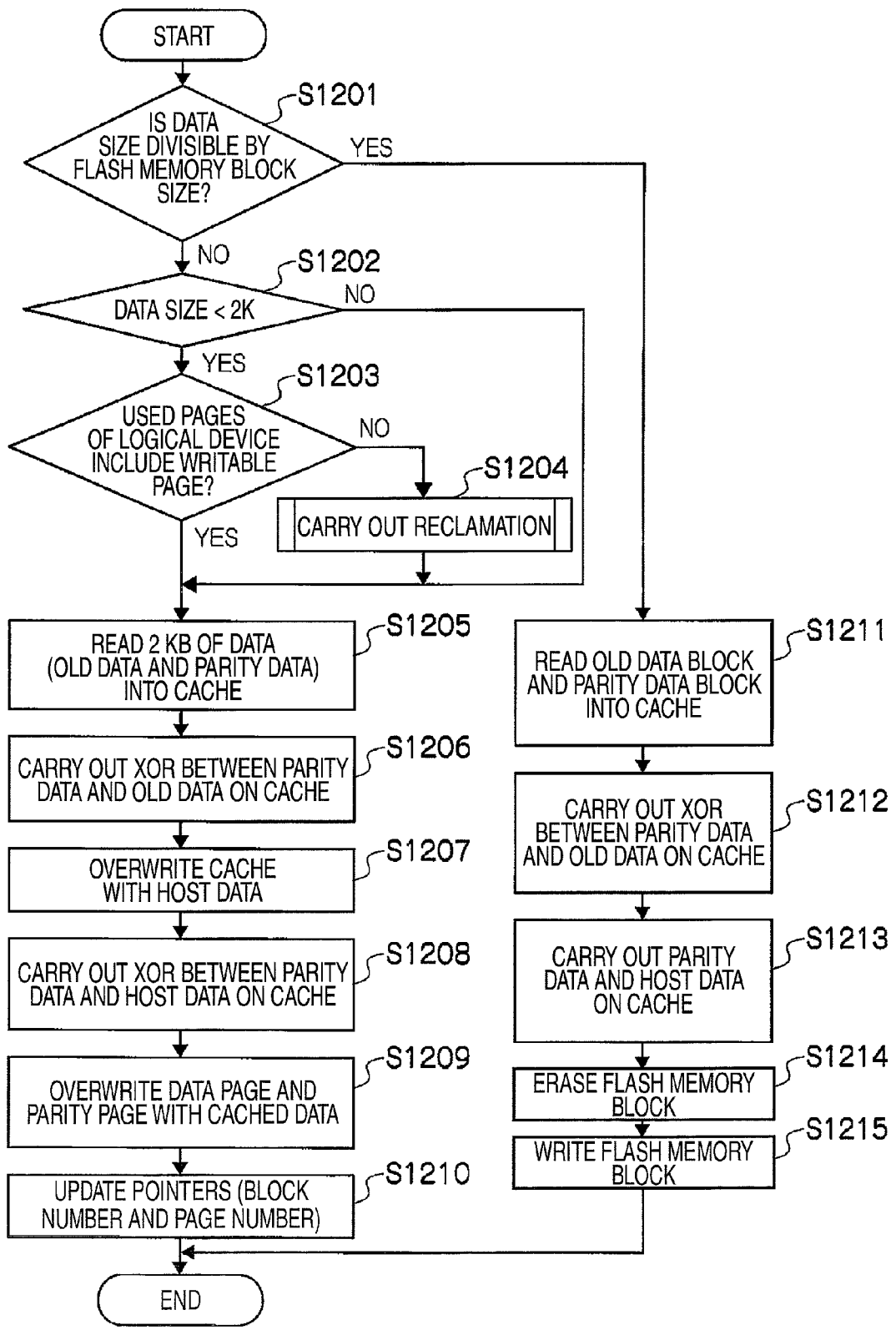
FIG. 12 is an example flow chart of a write I/O operation in the first example embodiment of the invention.

An I/O process will now be described. FIG. 12 shows an example write process performed by the I/O processing section 262 of the controller 210. Operations of this process will be described below.

At operation S1201, the I/O processing section 262 checks the data size of a transfer length of SCSI write I/O received from the host 100 to confirm that the data size is not divisible by the flash memory block size. When the data size is not divisible, the process proceeds to operation S1202. When the data size is divisible, the process proceeds to operation S1211.

At operation S1202, the I/O processing section 262 confirms that the data size of the write I/O received from the host 100 is smaller than the page size. When the data size is smaller than the page size (S1202: YES), the process proceeds to operation S1203. When the data size is equal to the page size (S1202: NO), the process proceeds to operation 1205.

At operation S1203, the I/O processing section 262 checks whether a number of pages of interest are remaining in the logical devices of interest. When there are remaining pages (S1203: YES), the process proceeds to operation S1205. If there is no remaining page (S1203: NO), the process proceeds to operation S1204.

Figure 14:
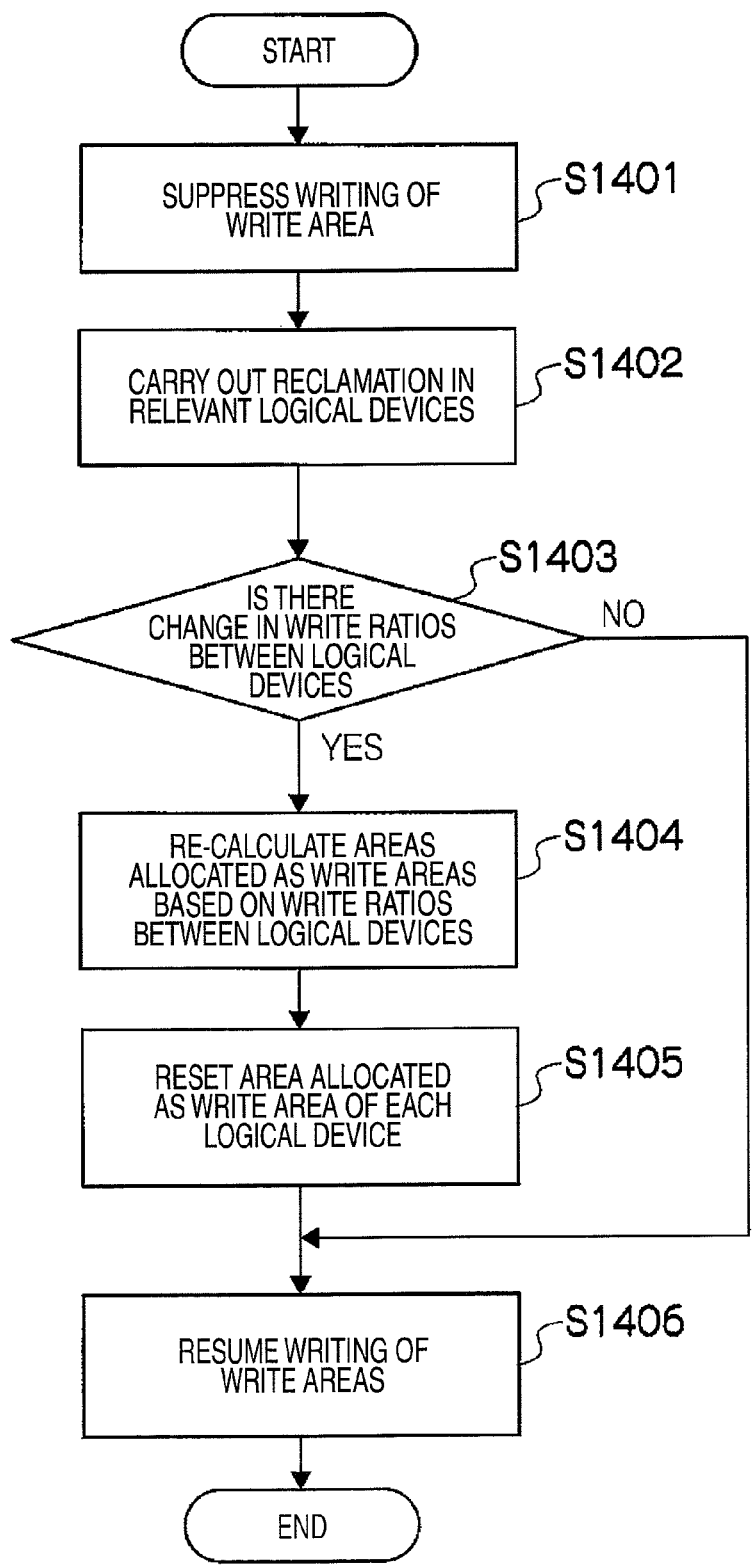
FIG. 14 is an example flow chart of a reclamation process in the first example embodiment of the invention.

At operation S1204, the I/O processing section 262 performs a reclamation process as shown in FIG. 14.

At operation S1205, the I/O processing section 262 reads 2 KB of data into the cache memory 213 from the write areas of flash memory packages in which data having start addresses and capacities specified by the host 100 is stored. When the write areas have no data, data is read from the user areas. Similarly, 2 KB of parity data is read into the cache memory 213.

At operation S1206, the I/O processing section 262 carries out an XOR operation between the data and the parity data on the cache memory 213 read at operation S1205, to generate parity data excluding the data on the cache memory 213.

At operation S1207, the I/O processing section 262 overwrites the 2 KB of old data which is indented to write from the host with host data.

At operation S1208, the I/O processing section 262 carries out an XOR operation between the data on the cache memory 213 and the parity data generated at operation S1206, to generate new parity data.

At operation S1209, the I/O processing section 262 writes the data updated at operation S1206 on the page indicated by the point block number 1002 and the pointer page number 1003 on the table 1000 of the initial flash memory package. The I/O processing section 262 updates the associated block number field 1012 and size number field 1013 associated with the columns of the block number 1010 and the page number 1011 corresponding to the pointer block number 1002 and the pointer page number 1003 of the table 1000 shown in FIG. 10. A similar operation is taken for the parity data generated at operation S1208. Specifically, the data is written on the page indicated by the pointer block number 1002 and the pointer page number 1003 on the table 1000 of the flash memory package which has been read. The associated block number field 1012 is updated to the block number of the user area of the flash memory chip from which data is written, and the size field 1013 is updated to the amount of data written on the page.

At operation S1210, the I/O processing section 262 increments the pointer page number 1003. When the process enters the next block, the block number is also incremented.

At operation S1211, the I/O processing section 262 reads one block worth of data into the cache memory 213 from the user area of the flash memory package where data having a start address and a capacity specified by the host 100 is stored.

At operation S1212, the I/O processing section 262 carries out an XOR operation between the data and parity data on the cache memory 213 read at operation S1211, to generate parity data excluding the data on the cache memory 213.

At operation S1213, the I/O processing section 262 carries out an XOR between the old data which is indented to write from the host on the cache memory 213 and the parity data generated at operation S1206, to generate new parity data.

At operation S1214, the I/O processing section 262 erases the block of the flash memory chip in which data is to be written.

At operation S1215, the I/O processing section 262 writes the data and parity in the flash memory block. Thus, the write process is terminated.

Figure 13:
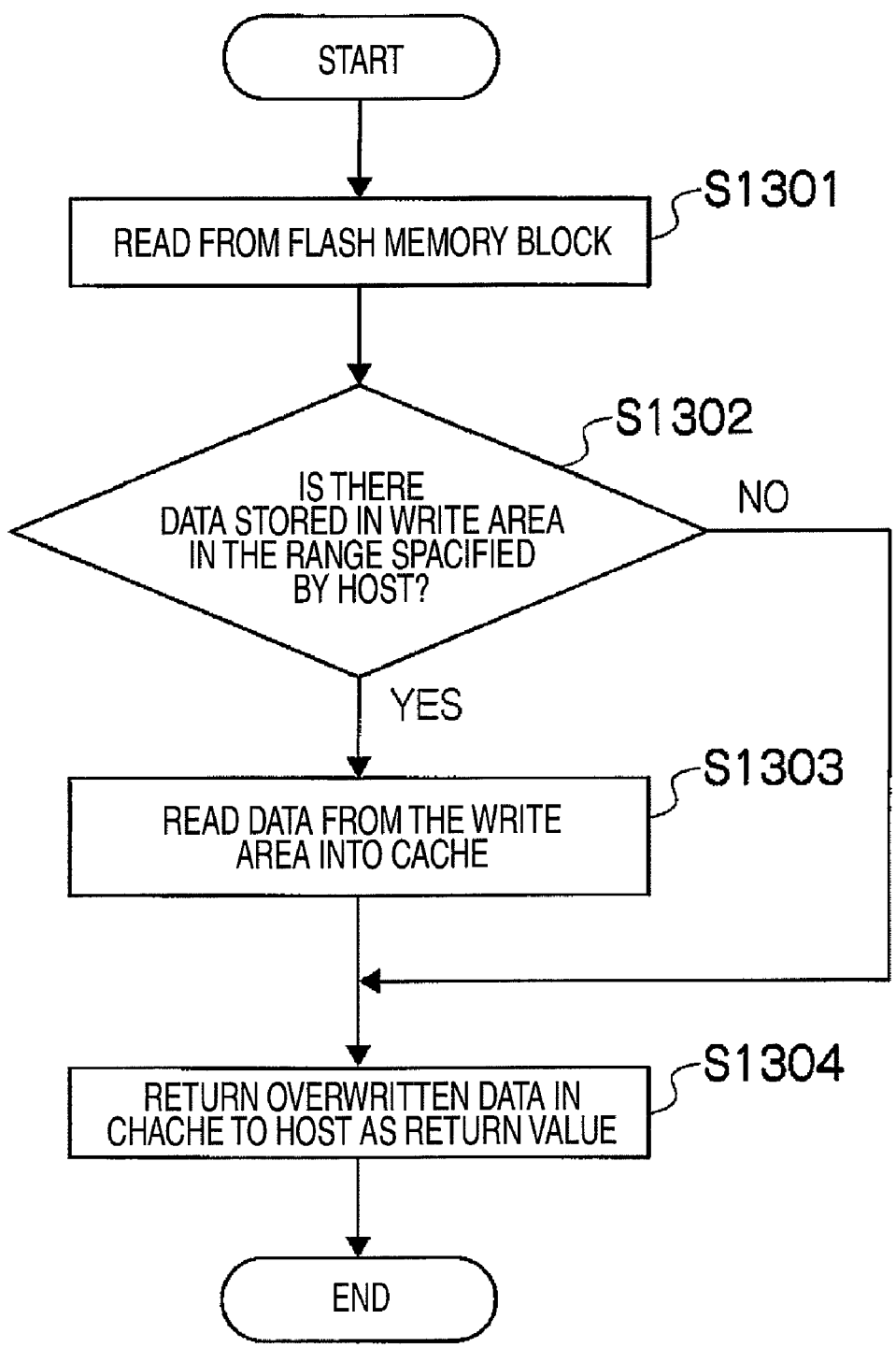
FIG. 13 is an example flow chart of a read I/O operation in the first example embodiment of the invention.

FIG. 13 shows an example read process performed by the I/O processing section 262 of the controller 210. Operations of the process will be described below.

At operation S1301, the I/O processing section 262 reads a block of a flash memory chip of a logical device corresponding to data having a start address and size specified by an SCSI read command from a host 100, the block being read onto the cache memory 213.

At operation S1302, the I/O processing section 262 refers to the write area of each logical device on the table 1000 to determine whether there is updated data in the block in the area (start position and size) specified by the SCSI read command from the host 100 with reference to the associated block number field 1012 and the size field 1013. When there is data (S1302: YES), the process proceeds to operation S1303. When there is no data (S1302: NO), the process proceeds to operation S1304.

At operation S1303, the I/O processing section 262 reads the data from the write area into the cache memory 213 to overwrite the data of a block which has been previously read.

At operation S1304, the I/O processing section 262 returns the data overwritten on the cache memory 213 to the host 100 as a return value. The read process is thus terminated.

A description will now be made on a reclamation process performed at the time of a write or when the manager changes the capacity of logical devices. FIG. 14 is an example flow chart of the reclamation process performed by the I/O processing section 262. Operations of the process will be described below.

At operation S1401, the I/O processing section 262 inhibits additional writing of the write areas of the flash memory chips of the logical devices of interest.

At operation S1402, the I/O processing section 262 refers to the table 1000 and overwrites the user area of each logical device with page data in all write areas, based on the associated block number field 1012 and the size field 1013. When all pages have been written out, the block corresponding to the start address in the start address field 803 is set as the pointer block, and the pointer page number is reset to "0".

At operation S1403, the I/O processing section 262 determines whether the write percentages between the logical devices have been changed or not. When the percentages have been changed (S1403: YES), the process proceeds to operation S1402. When the percentages have not been changed (S1403: NO), the process proceeds to operation S1406.

At operation S1404, the I/O processing section 262 recalculates the start positions and pages of areas allocated as write areas based on the write percentages between the logical devices.

At operation S1405, the I/O processing section 262 substitutes values obtained by the re-calculation for the start addresses in the start address field 802 in FIG. 8, and the allocated page counts in the allocated page count field 803.

At operation S1406, the I/O processing section 262 resumes additional writing of the write areas of the flash memory chips of the logical devices of interest.

The I/O processing section 262 checks whether any change has been made in the write percentages of the logical devices at operation S1402 as described above. FIG. 15 shows an example GUI 1500 used for making such a change. That is, FIG. 15 is an illustration showing an example of a GUI 1500 for managing write areas of logical devices.

The management GUI 1500 has a field 1501 displaying RAID group numbers (RG#), a field 1502 displaying logical devices to be subjected to area allocation, a field 1503 displaying the current allocation percentages, a field 1504 displaying recommended allocation percentages, a field 1511 displaying alerts associated with the allocation percentages in the field 1503, a field 1505 displaying the number of reclamations per day, a field 1506 displaying reclamation percentages relative to a maximum number of reclamations, a field 1507 displaying application (AP)-dependent percentages, and a field 1508 displaying alerts.

When there is a great difference, e.g., a difference in the excess of ±10 percent, between a current allocation percentage and a recommended allocation percentage, the management console 250 notifies the manager of the fact using means of communication such as SNMP (Simple Network Management Protocol), mail, or SMS (Short Message Service) to request the manager to change the allocation percentage in the field 1503.

The manager defines the current allocation percentage for each logical device number according to the recommended percentage. The recommended percentage is the percentage of write iops (IOs per a second) of each logical device relative to the sum of average iops of each logical device in FIG. 4. The current allocation percentages of logical devices in a RAID group are set such that 100 percent allocation is reached by the entire logical devices. Although the percentages are input by the manager in the present embodiment, recommended allocation values may alternatively be applied as they are and may be changed in real time automatically.

The numbers of reclamation 1505 are referred to from the reclamation frequency field 806 in FIG. 8. The reclamation percentage 1506 of each logical device is the percentage of the number of reclamations of the device per day relative to a maximum number of reclamations which can be performed per day. The percentage is calculated using Equation 1 shown below.

Reclamation percentage=number of reclamations/(24 hours/(time required to write of all write areas of each logical device+time required to erase blocks equivalent to the pages of the write areas of interest))      Equation 1

The application-dependent percentage field 1507 is displayed when a lower limit value and an upper limit value have been set by a reclamation percentage setting section 121 provided on the host 100 as shown in FIG. 2. When no value is set, "-" is displayed in the field. In this case, a reclamation threshold (lower limit value) 1509 and another reclamation threshold (upper limit value) 1510, which are system default values, are used. When the threshold values are exceeded, alert boxes are displayed in the alert field 1508, and an area management GUI (to be described later) as shown in FIG. 17 is displayed by an alert box is clicked.

A description will now be made on operations performed when the reclamation percentage thresholds are exceeded. When the upper limit value for reclamation percentages is exceeded, it is determined that reclamations are occurring at a high frequency which can affect performance. It is therefore advisable to increase the number of flash memory packages to increase the number of write areas dynamically. When the lower limit value is exceeded, there are unnecessary write areas. Then, the number of write areas is reduced, and some areas are therefore released dynamically. The released areas may be used for other purposes. For example, they may be used as user areas or substitution blocks.

Figure 16:
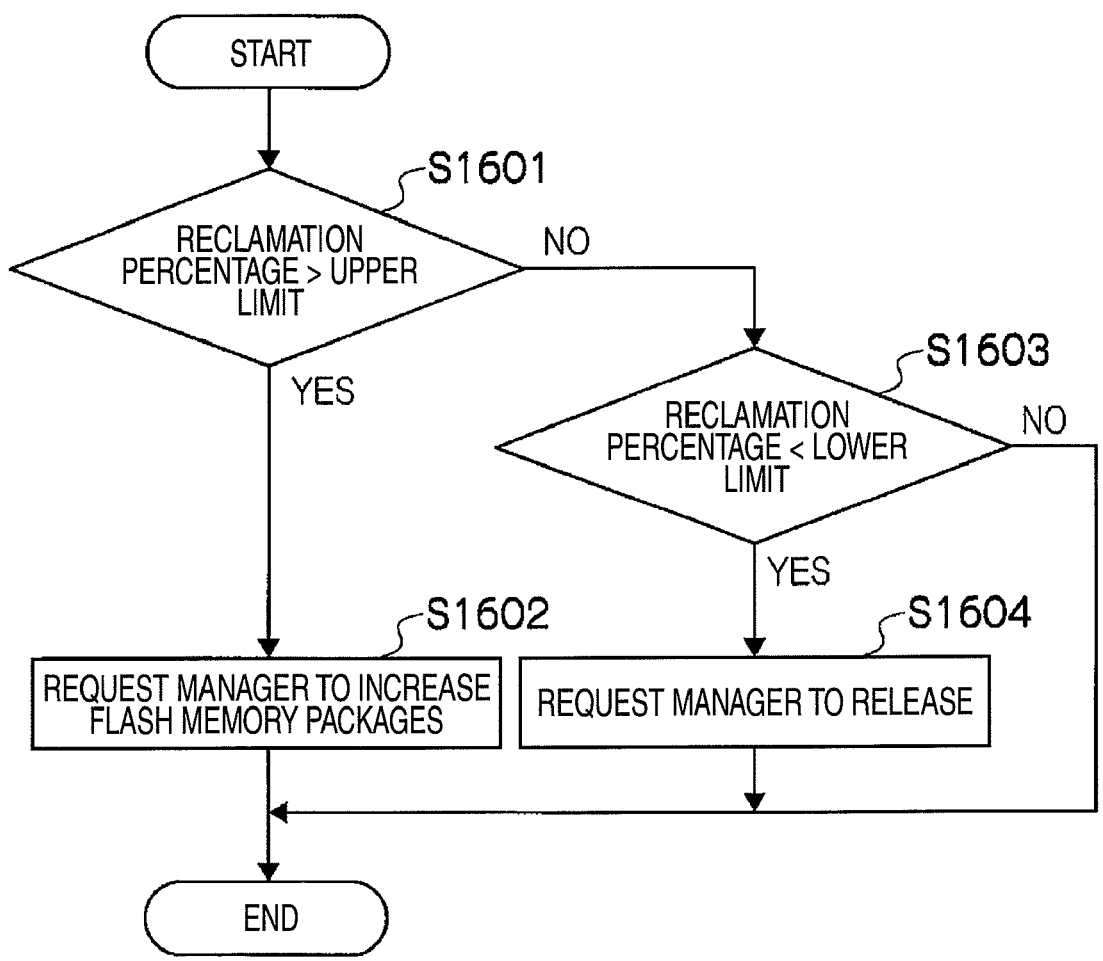
FIG. 16 is an example flow chart showing a process of giving an alert indicating a need of an increase or decrease in the number of write areas based on a reclamation count, performed by a management console in the first example embodiment of the invention.

FIG. 16 is an example flow chart showing a process of giving an alert indicating a need of an increase or decrease in the number of write areas based on a reclamation count. Operations of the process will be described below.

At operation S1601, the management console 250 checks whether a reclamation percentage is in the excess of the upper limit value or not. Referring to the upper limit value, when an upper limit value is defined in the application-dependent percentage field 1507, the value is used. When no upper limit value is defined, the reclamation threshold value (upper limit value) 1510 is used. When the reclamation percentage is in the excess of the upper limit value (S1601: YES), the process proceeds to operation S1602. When the upper limit value is not exceeded (S1601: NO), the process proceeds to operation S1603.

At operation S1602, the management console 250 sends a request for an increase in the number of flash memory packages to the manager using means for communication such as SNMP, mail, or SMS. At this time, a button indicating such a request for an increase is displayed in the alert field 1508.

At operation S1603, the management console 250 checks whether the reclamation percentage exceeds the lower limit value or not. Referring to the lower limit value, when a lower limit value is defined in the application-dependent percentage field 1507, the value is used. When no lower limit value is defined, the reclamation threshold value (lower limit value) 1509 is used. When the reclamation percentage is below the lower limit value, the process proceeds to operation S1604. When the lower limit value is not exceeded, the process is terminated.

The alert process is periodically activated, e.g., on a daily basis or at intervals of several hours to confirm that the computer system 1 is operating properly. The check may be made at the time of a reclamation operation.

Figure 17:
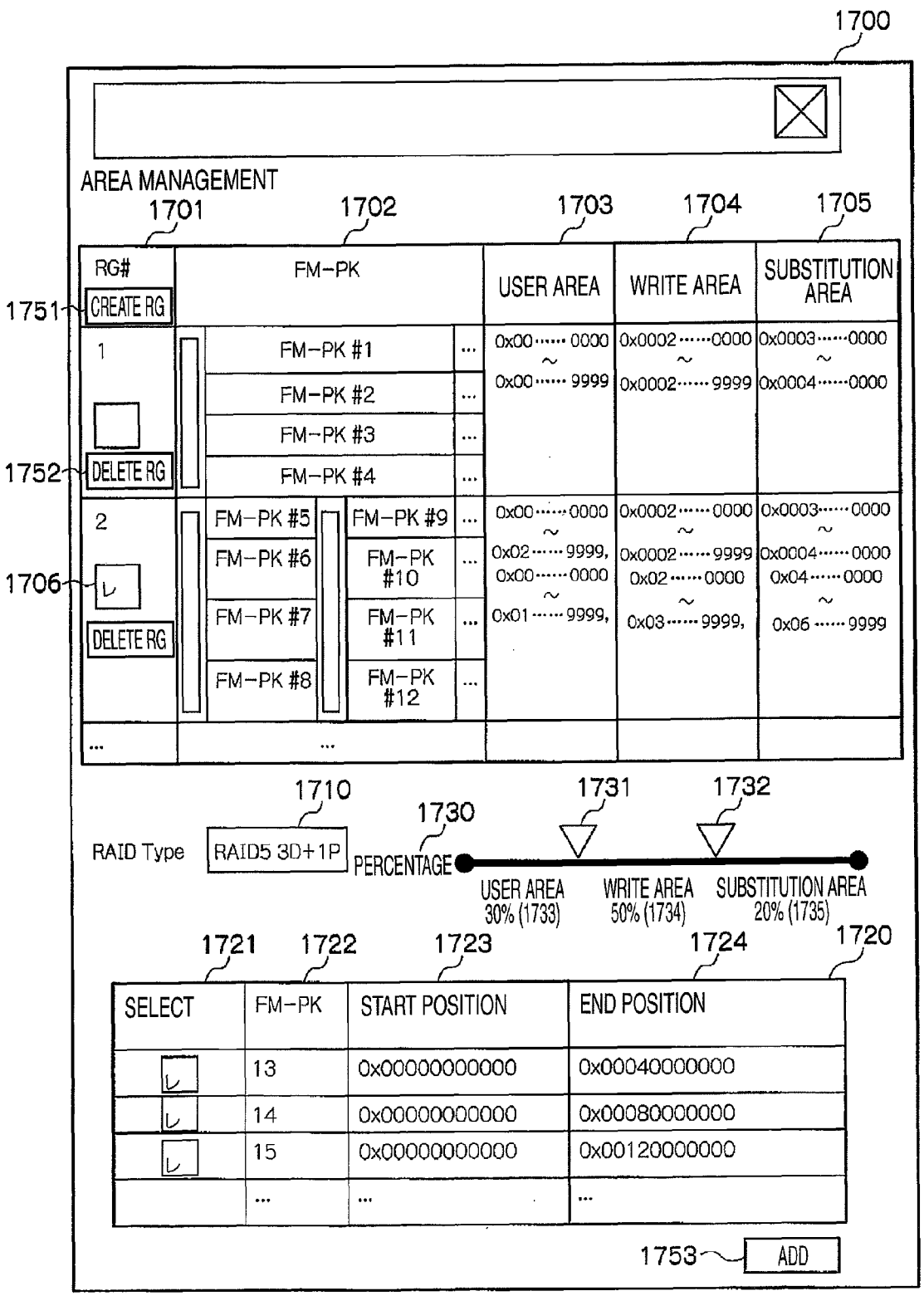
FIG. 17 shows an example of a GUI used for allocation of various areas in the first example embodiment of the invention.

FIG. 17 is an illustration showing an example GUI displayed on the management console 250.

An area management screen 1700 shows a field 1701 displaying RAID group numbers (RG#), a field 1702 displaying flash memory package numbers, a field 1703 displaying user areas, a field 1704 displaying write areas, and a field 1705 displaying substitution areas. As described above, when the flash memory packages have different capacities, address spaces may be managed with reference to the smallest capacity in the present embodiment.

Referring to the creation of RAID groups, a new RAID group is created when a RAID group generation button 1751 is pressed. Referring to the deletion of RAID groups, each RAID group is deleted by pressing a RAID group deletion button 1752 associated with the group. To allocate flash memory packages to a RAID group, a desired RAID type 1710 is selected. Then, required flash memory packages (for example, four flash memory packages in the case of RAID level 5 (3 data plus 1 parity)) are selected from a list 1720 of unused flash memory packages using a selection check box 1721.

The list of unused flash memory packages include a field displaying flash memory packages to be selected, a field displaying flash memory package (FM-PK) numbers, a field displaying start address positions of the flash memory packages, and a field 1724 displaying end address positions of the flash memory packages.

After using slider bars 1731 (for partitioning user areas and write areas) and 1732 (for partitioning write areas and substitution areas) to select area percentages 1730, the manager presses an "add" button 1753 to add the flash memory packages to the RAID group selected in the field 1701.

When the slide bars 1731 and 1732 are make to overlap each other and write areas therefore occupy 0 percent, the management console 250 returns the process as an error. The reason is that no area is left for write areas when 0 percent is set for write areas. When 0 percent is set for write areas, data can be accessed by writing data in blocks on a read-modify-write basis. Referring to the write operation, data is read in blocks onto the cache memory 213, and the data on the cache memory 213 is overwritten with write data from a host. Thereafter, the data in the initial blocks of the flash memory chips of interest are erased, and data is written in the blocks.

Figure 18:
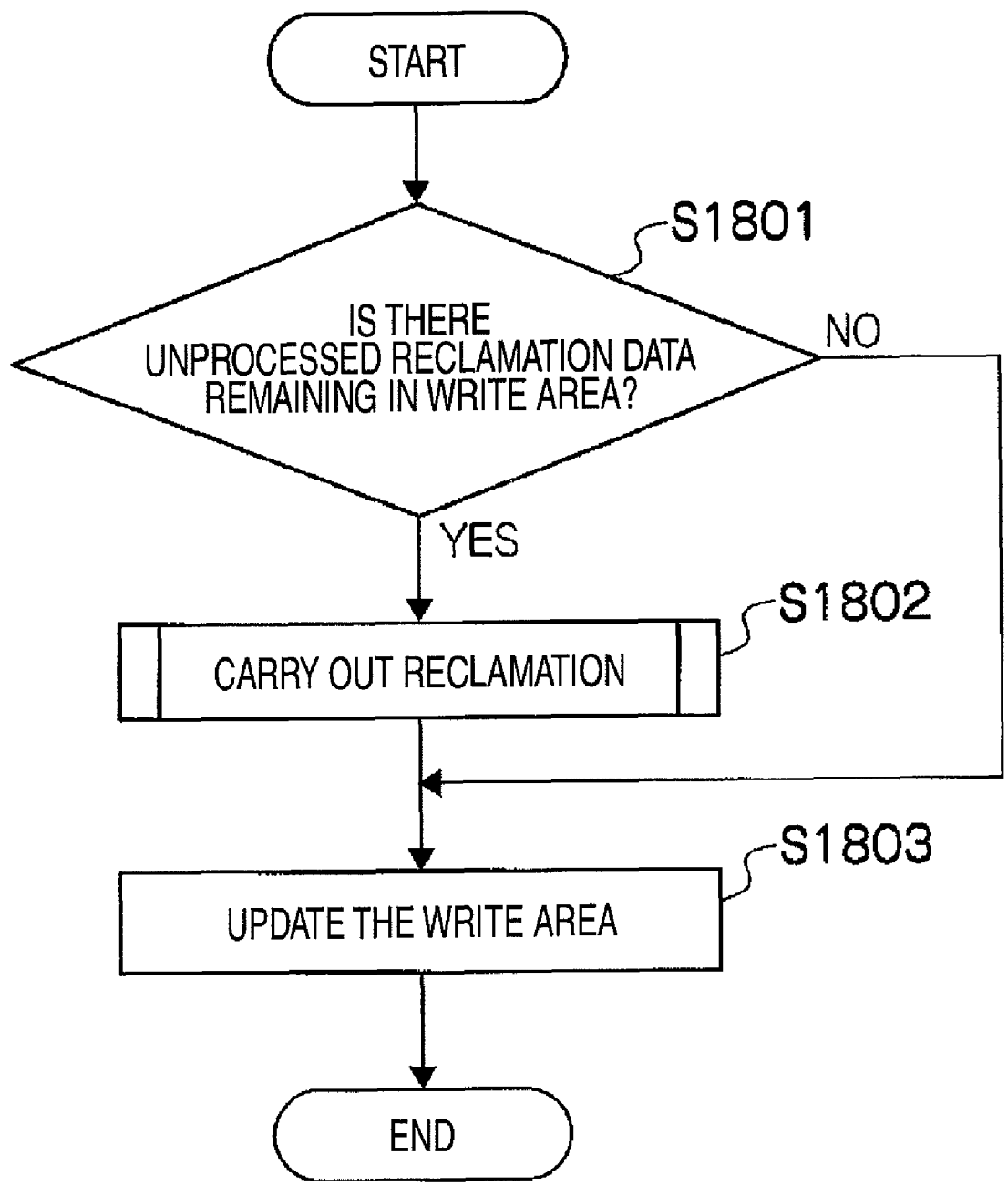
FIG. 18 is an example of a flow chart of a process of reducing write areas in a second example embodiment of the invention.

A description will now be made on steps and operations performed when a request for releasing of write areas is made by the manager at operation S1604 shown in FIG. 16. When the manager selects each column showing a flash memory package of FIG. 17, percentages of areas of the flash memory package is displayed at 1730. The write area 1734 is released according to a write area percentage that is reached when the manager moves the slider bars 1731 and 1732 in the direction of reducing the write area. FIG. 18 shows an example flow chart of the releasing process performed by the manager console 250.

At operation S1801, when unprocessed reclamation data is left in the address space of the write areas after the adjustment to reduce write areas or when the updated write areas reside in the space indicated by the pointer block number 1002 and the pointer page number 1003 (S1801: YES), the management console 250 proceeds to operation S1802. If not (S1801: NO), the process proceeds to operation S1803.

At operation S1802, the management console 250 performs a reclamation process. Specifically, operations S1402, S1404, and S1405 among the operations shown in FIG. 14 are performed. Since the reclamation process at operation S1802 is performed while inhibiting write, there is no need for providing a operation of inhibiting additional writes in the write areas.

At operation S1803, the management console 250 updates the write areas of the flash memory packages of interest with the new write areas. The start address field 803 and the allocated page count field 804 associated with each logical device number field 801 are also updated. The reclamation process is thus terminated. The released areas are managed as unused areas, and the areas may be used as user areas or areas for logical devices. Alternatively, the areas may be used as substitution areas.

The computer system 1 of the first example embodiment of the invention allows write areas to be efficiently written in units adapted to an application or host computer.

The frequency of reclamation is monitored with reference to an upper limit value or threshold. When it is determined that there is a shortage of write areas because of frequent erasure, an increase in the number of flash memories is instructed. The number of flash memories is increased to increase write areas, and the number of erasures can therefore be made proper to prevent the degradation of performance. A reduction in the number of reclamations thus achieved makes it possible to suppress the degradation of media attributable to the number of erasures that is peculiar to flash memories.

The frequency of reclamation is also monitored with reference to a lower limit value or threshold. When it is determined that write areas exist in the excess of what is required because erasure occurs not so great number of times, the number of write area is reduced. Therefore, the number of erasures can be made proper, and wasteful write areas can be reduced.

Second Example Embodiment

A second example embodiment of the invention will now be described. The first embodiment is based on an assumption that a user area is always allocated in a flash memory package. The second embodiment is based on an assumption that each flash memory package is provided with a user area or a write area to use those areas separately. Such a configuration is advantageous in that write areas can be added and deleted according to required write performance in units which are constituted by flash memory packages. In the second embodiment of the invention, a substitution area is provided in each of flash memory packages serving as user areas and flash memory packages serving as write areas. Alternatively, substitution areas may be provided in independent flash memory packages.

A configuration of a computer system will now be described. The description of a configuration of a computer system 1 according to the second example embodiment of the invention will omit features which are identical to features in the computer system 1 of the first example embodiment, such features being indicated by like reference numerals. The following description will focus on differences between the first and second embodiments in configuration and operations. In the second embodiment, memories (flash memory packages) are used in a manner different from that is described above with reference to FIG. 6.

FIG. 19 is an illustration which provides an example image of each area of memories (flash memory packages). Like the first embodiment, one RAID group is formed by flash memory packages #5 to #12, and the flash memory packages are concatenated and treated as a single device. A difference from the first embodiment is that a user area 1901 is formed by the row of flash memory packages #5 to #8, and that a write area 1903 is formed by the row of flash memory packages #9 to #12.

Figure 20:
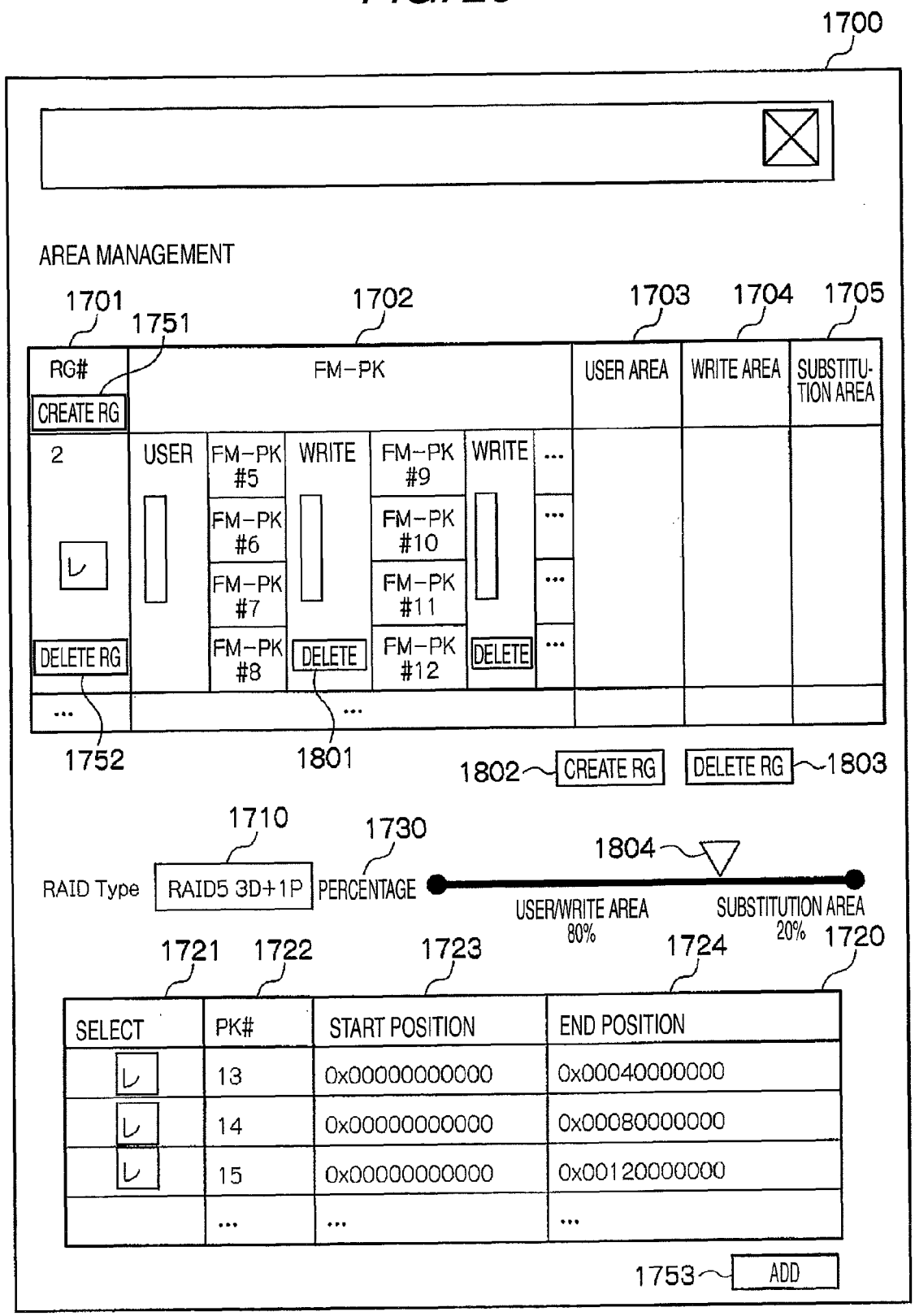
FIG. 20 shows an example of a GUI for managing write areas in the second example embodiment of the invention.

Operations of the computer system 1 of the present embodiment will now be described. The present embodiment is different from the first embodiment as follows. In an area management screen 1700 shown in FIG. 20, a "delete" button 1801 is added to a write column among columns formed by RAIDs. In the percentage 1730 showing allocation percentages, a percentage of a user or write area is shown instead of percentages of a user area and a write area, and the user area or write area is separated from a substitution area by a slide bar 1804.

Figure 21:
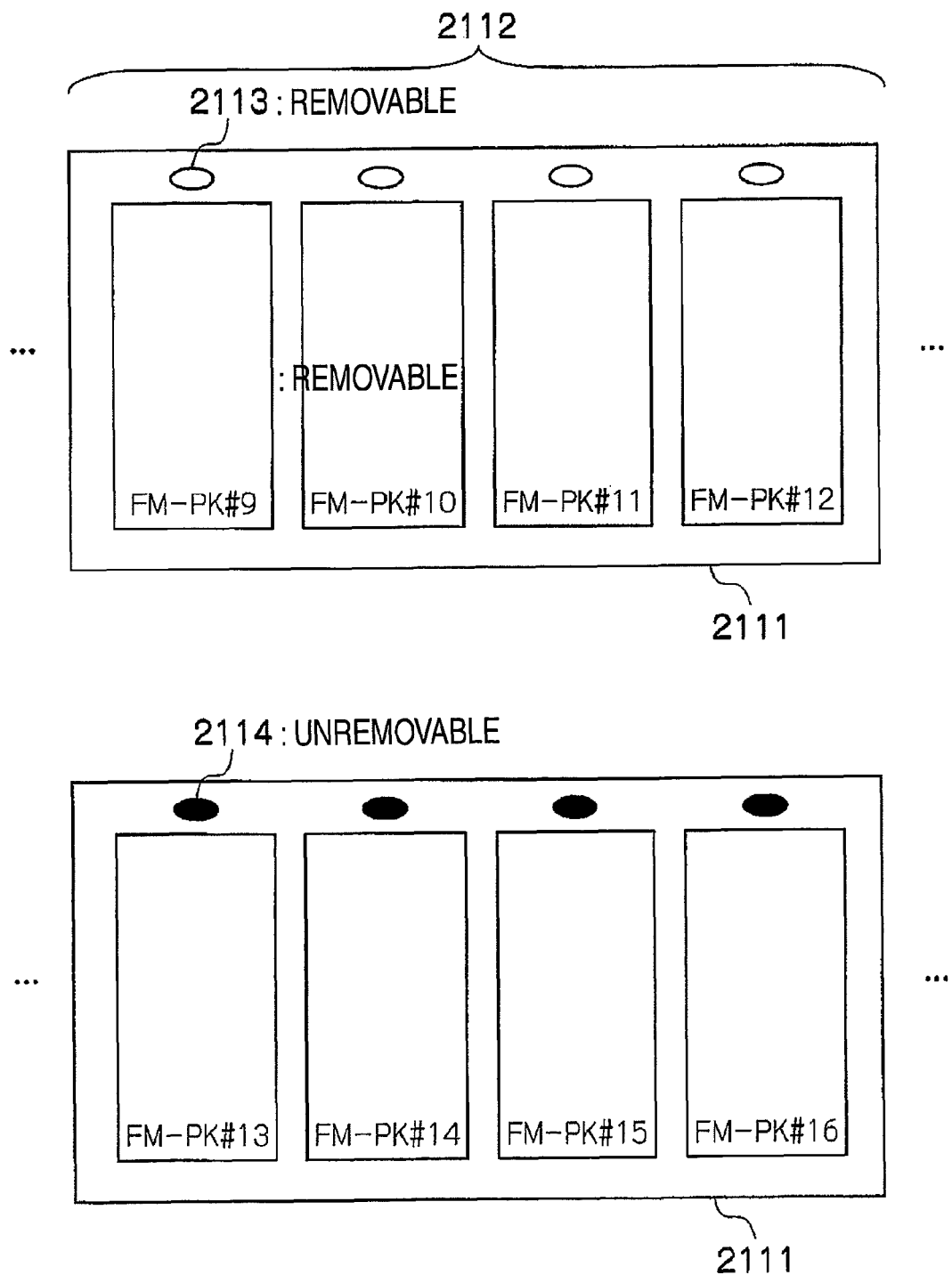
FIG. 21 is an illustration showing examples of LEDs indicating whether flash memory packages can be inserted and removed in and from slots in the second example embodiment of the invention.

After a manager presses the delete button 1801, a process of reducing the write area shown in FIG. 18 is performed. At this time, a new write area is provided only in a flash memory package to which a write area is allocated among the remaining flash memory packages. When the write area in a flash memory package is entirely deleted, the flash memory package may be removed from a flash memory adaptor 220. At this time, the flash memory package may be removed from a flash memory package slot 2111 (FIG. 21) of the flash memory adaptor 220. LEDs 2113 and 2114 associated with the flash memory packages indicate whether the flash memory packages can be inserted and removed in and from the slots. An LED 2113 indicates that a flash memory package can be inserted and removed, and an LED 2114 indicates that a flash memory package cannot be inserted or removed. A manager can easily find flash memory packages which can be removed from such LED indication.

In the computer system 1 of the second embodiment of the invention, since user areas and write areas are separated from each other, write areas can be added and reduced in units constituted by flash memory packages according to required write performance.

Another embodiment may include a processing section overwriting the first area with the write log data when the second area has no vacancy (i.e., is full).

Another embodiment can be configured to operate wherein after the second area is reduced, the processing section compares the range of the second area before the reduction and the range of the second area after the reduction, overwrites the range of the area before to the reduction when the range of the area before the reduction is not within the range of the area after the reduction, and does not overwrites the range of the area before the reduction when the range of the area before the reduction is within the range of the area after the reduction.

The invention can be widely used in storage apparatus, methods of managing storage areas of such apparatus, and flash memory packages.

What is claimed is:

1. A storage apparatus for storing data transmitted from one or more host computers, comprising:
    one or more flash memory packages having a plurality of flash memory chips, a storage area provided by the one or more flash memory packages including a first area that is an area for storing actual data formed by one or more logical devices and a second area that is an area for storing a write log data based on a write instruction, the first and second areas being provided in each of the one or more flash memory packages;
    a reclamation process section executing a reclamation process for overwriting a predetermined memory area with data stored in the second area, to make portions of the second area available for storing subsequent data;
    a monitoring section monitoring a frequency at which the reclamation process occurs; and
    a changing section for changing a size of the second area dynamically according to the frequency at which the reclamation process occurs.

2. A storage apparatus according to claim 1, wherein the changing section changes the second area for each of the logical devices.

3. A storage apparatus according to claim 1, comprising a processing section overwriting the first area with the write log data when the second area has no vacancy.

4. A storage apparatus according to claim 3, comprising an addition request output section outputting a request for an addition to the second area to a managing apparatus when the frequency exceeds an upper limit value of a certain range of frequencies.

5. A storage apparatus according to claim 4, comprising an acquisition section acquiring an instruction for a change in the setting of the upper limit value from the managing apparatus.

6. A storage apparatus according to claim 4, comprising an acquisition section acquiring an instruction for a change in the setting of the upper limit value from any of the host computers.

7. A storage apparatus according to claim 3, comprising a reduction request output section outputting a request for a reduction of the second area to a managing apparatus when the frequency exceeds a lower limit value of a certain range of frequencies.

8. A storage apparatus according to claim 7, comprising an acquisition section acquiring an instruction for a change in the setting of the lower limit value from the managing apparatus.

9. A storage apparatus according to claim 7, comprising an acquisition section acquiring an instruction for a change in the setting of the lower limit value from any of the host computers.

10. A storage apparatus according to claim 7, comprising a display section displaying a slot position indicating whether flash memory packages can be inserted and removed in and from a slot of the storage apparatus.

11. A storage apparatus according to claim 1, wherein the one or more flash memory packages form a RAID (Redundant Array of Inexpensive Disks) group.

12. A storage area managing method of a storage apparatus for storing data transmitted from one or more host computers, wherein
    a storage area provided by one or more flash memory packages having a plurality of flash memory chips includes a first area that is an area for storing actual data formed by one or more logical devices and a second area that is an area for storing a write log data based on a write instruction, the first and second areas being provided in each of the one or more flash memory packages, the method comprising:
    executing a reclamation process for overwriting a predetermined memory area with data stored in the second area, to make portions of the second area available for storing subsequent data;
    monitoring a frequency at which the reclamation process occurs; and
    changing a size of the second area dynamically according to the frequency at which the reclamation process occurs.

13. A storage area managing method of a storage apparatus according to claim 12, wherein the changing the size of the second area is capable of changing the size of the second area for each of the logical devices.

14. A storage area managing method of a storage apparatus according to claim 12, comprising overwriting the first area with the write log data when the second area has no vacancy.

15. A storage area managing method of a storage apparatus according to claim 14, comprising:
    outputting a request for an addition to the second area to a managing apparatus when the frequency exceeds an upper limit value of a certain range of frequencies.

16. A storage area managing method of a storage apparatus according to claim 14, comprising:
    outputting a request for a reduction of the second area to a managing apparatus when the frequency exceeds a lower limit value of a certain range of frequencies.

17. A storage area managing method of a storage apparatus according to claim 12, wherein the one or more flash memory packages form a RAID group.

18. A flash memory package having a plurality of flash memory chips used in a storage apparatus for storing data transmitted from one or more host computers, comprising:
    a first area that is an area for storing actual data formed by one or more logical devices; and
    a second area that is an area for storing a write instruction from the host computer to the logical device, wherein
    a size of the second area is changed in relation to a frequency at which a reclamation process occurs, where the reclamation process executes overwriting a predetermined memory area with data stored in the second area, to make portions of the second area available for storing subsequent data.

19. A storage apparatus for storing data transmitted from one or more host computers, comprising:
    one or more flash memory packages having a plurality of flash memory chips, a storage area provided by the one or more flash memory packages including a first area that is an area for storing actual data formed by one or more logical devices and a second area that is an area for storing a write log data, the first and second areas being provided in each of the one or more flash memory packages;
    a reclamation process section executing a reclamation process for overwriting a predetermined memory with data stored in the second area and thereafter writing the data into the first area;
    a monitoring section monitoring a frequency at which the reclamation process occurs; and
    a changing section for changing a size of the second area dynamically in relation to the frequency at which the reclamation process occurs.

* * * * *